C. ORUD.
DRAFT APPLIANCE.
APPLICATION FILED JAN. 22, 1917.
1,237,546.
Patented Aug. 21, 1917.
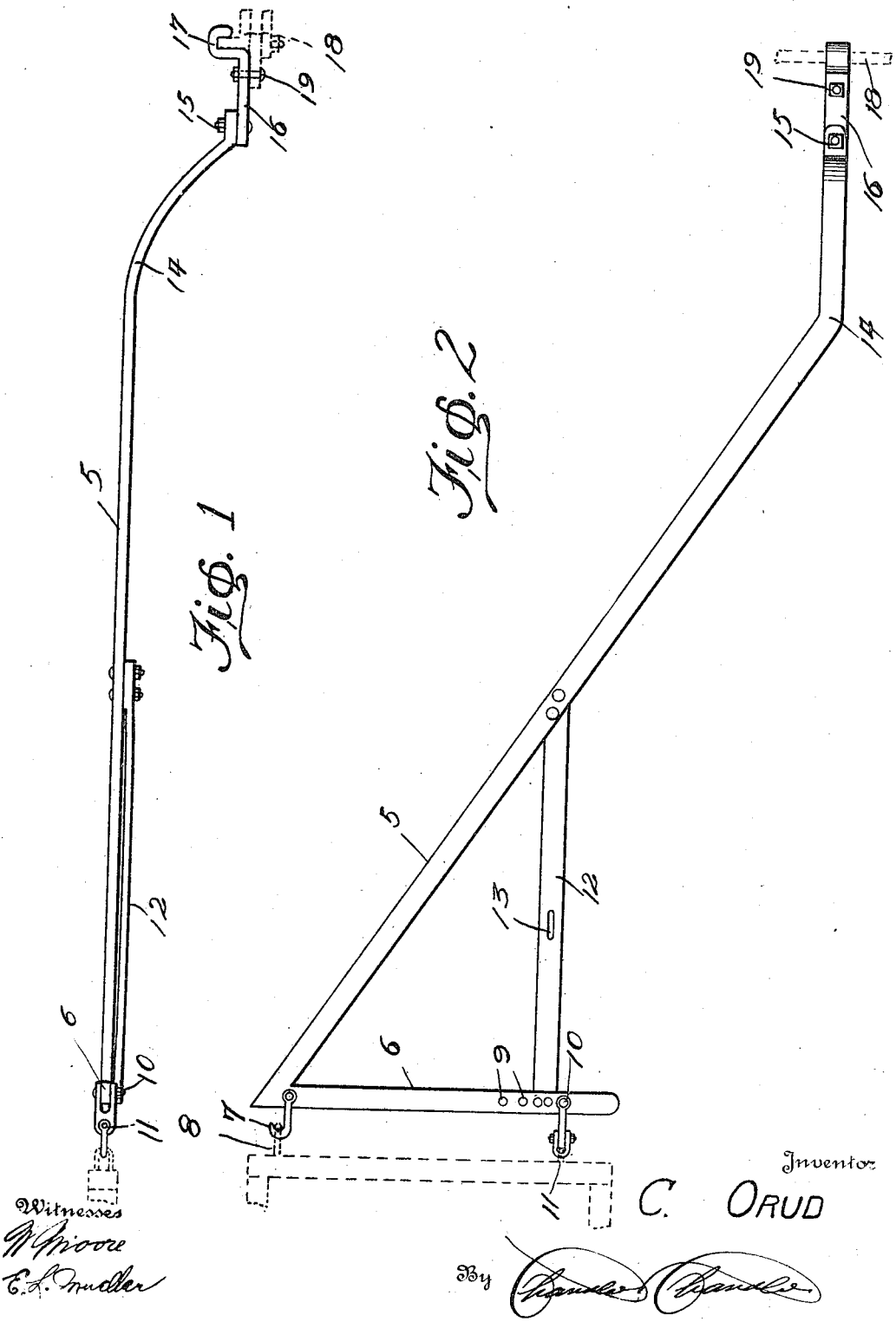
Witnesses
W. Moore
E. L. Mudler
Inventor
C. ORUD
By Chandler & Chandler

UNITED STATES PATENT OFFICE.

CARL ORUD, OF WOLVERTON, MINNESOTA.

DRAFT APPLIANCE.

1,237,546.  Specification of Letters Patent.  Patented Aug. 21, 1917.

Application filed January 22, 1917. Serial No. 143,784.

*To all whom it may concern:*

Be it known that I, CARL ORUD, a citizen of the United States, residing at Wolverton, in the county of Wilkin, State of Minnesota, have invented certain new and useful Improvements in Draft Appliances; and I do hereby declare the following to be a full, clear, and exact description of the invention, such as will enable others skilled in the art to which it appertains to make and use the same.

This invention is an improvement in draft appliances and has particular reference to a coupling adapted for connecting a grain binder to a "Bull" tractor.

An object of the invention is the provision of a coupling of this character embodying simplicity of construction, efficiency in operation and one which may be attached to various types of binders.

Another object is to enable the operator to make sharp turns and draw the binder steadily and avoid the usual side sway or zigzag motion incident to couplings of known construction.

The inventive idea involved is capable of receiving a variety of mechanical expressions, one of which, for the purpose of illustrating the invention, is shown in the accompanying drawing, wherein:—

Figure 1 is a side elevation of the coupling constructed in accordance with the invention.

Fig. 2 is a top plan view thereof.

Referring more particularly to the drawing in which like reference characters indicate similar parts, the numeral 5 indicates the main draft member or bar which is adapted to extend in a diagonal direction between the binder and tractor and has the end thereof adjacent the binder provided with a hitching bar 6 which extends transversely and forms an acute angle therewith, said bars 5 and 6 being integrally formed. The bar 6 extends transversely of the front of the binder and is provided at one end with the hook 7 adapted to engage a clevis 8 carried by the front of the binder while the free end of said bar 6 is provided with a longitudinal row of openings 9 any one of which is adapted to receive the pivot of a hook 10 whereby said hook may be adjusted longitudinally of the bar in order to accommodate the coupling to various types of binders. The hook 10 is also adapted to engage a clevis 11 carried by the front of the binder and with the aid of the hook 7 and clevis 8 will securely connect the coupling to the binder. A brace connection 12 is secured at one end adjacent the free end of the bar 6 while its other end is similarly secured to the intermediate portion of the bar 5, said connection having a slot 13 therein employed for connecting the tilting lever of the binder to said connection 12.

The forward extremity of the draft member 5 is offset as indicated at 14 and bent downwardly as shown in Fig. 1. The forward extremity of the member 5 is pivotally connected, by means of a bolt 15, to the rear free end of a support 16 the forward end of which is bent into the form of a hook 17 adapted to engage the draw bar 18 of the tractor, said support being secured to the tractor by bolts 19.

What is claimed is:—

In a device for coupling a binder to a tractor, the combination of a draft member extending diagonally between said binder and tractor and having formed integrally with its rear end a transverse hitching bar adapted to extend across the front of the binder and provided with a series of alined openings, means adjustable longitudinally of said bar and mounted in one of said openings for attaching said bar to the binder, a brace connection between the free end of said bar and the intermediate portion of said draft member, the forward end of the latter being offset and curved downwardly, and a support carried by said tractor and pivoted to the forward end of said draft member.

In testimony whereof, I affix my signature, in the presence of two witnesses.

CARL ORUD.

Witnesses:
 M. GULLICKSON,
 T. G. KNUDSON.

Copies of this patent may be obtained for five cents each, by addressing the "Commissioner of Patents, Washington, D. C."